(12) United States Patent
Caspari et al.

(10) Patent No.: US 12,403,884 B2
(45) Date of Patent: Sep. 2, 2025

(54) METHOD FOR SECURING BRAKE FLUID

(71) Applicant: Continental Automotive Technologies GmbH, Hannover (DE)

(72) Inventors: Roland Caspari, Frankfurt (DE); Martin Baechle, Kelkheim (DE); Sebastian Mihm, Usingen (DE); Robert Grimm, Hofheim (DE)

(73) Assignee: Continental Automotive Technologies GmbH, Hannover (DE)

( * ) Notice: Subject to any disclaimer, the term of this patent is extended or adjusted under 35 U.S.C. 154(b) by 115 days.

(21) Appl. No.: 18/570,922

(22) PCT Filed: Jun. 2, 2022

(86) PCT No.: PCT/DE2022/200107
§ 371 (c)(1),
(2) Date: Dec. 15, 2023

(87) PCT Pub. No.: WO2022/262910
PCT Pub. Date: Dec. 22, 2022

(65) Prior Publication Data
US 2024/0217502 A1 Jul. 4, 2024

(30) Foreign Application Priority Data
Jun. 17, 2021 (DE) .................... 10 2021 206 182.6

(51) Int. Cl.
*B60T 17/22* (2006.01)
*B60T 7/04* (2006.01)
*B60T 13/66* (2006.01)

(52) U.S. Cl.
CPC .......... *B60T 17/222* (2013.01); *B60T 13/662* (2013.01); *B60T 17/225* (2013.01);
(Continued)

(58) Field of Classification Search
CPC ..... B60T 17/22; B60T 2270/403; B60T 7/042
See application file for complete search history.

(56) References Cited

U.S. PATENT DOCUMENTS

| 4,125,234 A | * | 11/1978 | Tregre | .................... B60T 13/16 188/351 |
| 2011/0175436 A1 | * | 7/2011 | Nakata | .................. B60T 8/4081 303/6.01 |

(Continued)

FOREIGN PATENT DOCUMENTS

| DE | 102011082492 A1 | 3/2013 |
| DE | 112012005989 T5 | 12/2014 |

(Continued)

OTHER PUBLICATIONS

Japanese Office Action dated Feb. 7, 2025 in correspondence with Japanese Application No. 2023-574205.

(Continued)

*Primary Examiner* — Long T Tran

(57) ABSTRACT

A method for controlling a brake system in the case of leaks is provided. The brake system has a mechanically actuable master brake cylinder, which is connected to a first partial reservoir of a brake fluid vessel, and has an electric linear actuator, which is connected to a second partial reservoir of the brake fluid vessel. The master brake cylinder and the linear actuator are connected via an electrically closable circuit isolating valve. In order to protect the brake fluid, in the event of a leak during a transition to a standby state, the linear actuator is activated to take a brake fluid volume out of the first partial reservoir via the open circuit isolating valve and to displace it into the second partial reservoir.

20 Claims, 3 Drawing Sheets

(52) U.S. Cl.
 CPC ... *B60T 2270/402* (2013.01); *B60T 2270/403* (2013.01); *B60T 2270/404* (2013.01); *B60T 2270/413* (2013.01)

(56) References Cited

U.S. PATENT DOCUMENTS

| | | | |
|---|---|---|---|
| 2015/0035351 A1 | 2/2015 | Okano | |
| 2016/0032995 A1* | 2/2016 | Nishino | F16D 65/18 188/72.3 |
| 2020/0307536 A1 | 10/2020 | Biller | |
| 2021/0339728 A1* | 11/2021 | Gaughan | B60T 13/665 |
| 2022/0169249 A1* | 6/2022 | Gaughan | B60T 17/22 |
| 2022/0324430 A1* | 10/2022 | Watanabe | B60T 11/26 |
| 2023/0202447 A1* | 6/2023 | Lee | B60T 13/146 200/82 D |
| 2023/0234545 A1* | 7/2023 | Yuan | F16D 65/18 |
| 2023/0286488 A1* | 9/2023 | Kim | B60T 13/686 |

FOREIGN PATENT DOCUMENTS

| | | |
|---|---|---|
| DE | 10343985 B4 | 5/2017 |
| DE | 102016222578 A1 | 5/2018 |
| DE | 102017222440 A1 | 7/2018 |
| DE | 102017222789 A1 | 6/2019 |
| DE | 102018211088 A1 | 1/2020 |
| DE | 102019213057 A1 | 3/2021 |
| DE | 102019219158 A1 | 6/2021 |
| EP | 3724045 A1 | 10/2020 |

OTHER PUBLICATIONS

Korean Office Action dated Jan. 23, 2025 in correspondence with Korean Application No. 10-2023-7039121.
German Search Report dated Apr. 14, 2022 for the priority German Patent Application No. 10 2021 206 182.6.
The International Search Report and the Written Opinion of the International Searching Authority mailed on Oct. 31, 2022 for the PCT Application No. PCT/DE2022/200107.

* cited by examiner

METHOD FOR SECURING BRAKE FLUID

TECHNICAL FIELD

The embodiments relate to a method for controlling a brake system in the case of leaks.

BACKGROUND

When initializing a brake system, for example when unlocking the vehicle or when a driver is approaching the vehicle, the filling level of the brake fluid vessel is typically checked. If this filling level lies below a threshold, it is assumed that there is a leak in the braking system.

The degradation of the brake system in the event of an external leak is the implementation of circuit separation. For this purpose, the single-circuit by-wire system is separated into a two-circuit system consisting of a driver's circuit with the master brake cylinder and a plunger circuit with the linear actuator by way of the circuit isolating valve being energized.

In the de-energized case, that is in particular in a standby state, when the vehicle is switched off, the brake system remains a single-circuit system since the circuit isolating valve has to be energized for circuit separation. As a result, in the case of a leak in the direction of one of the four wheels, the brake fluid volume of the first partial chamber, which is connected to the master brake cylinder, is lost.

In order to minimize the loss of brake fluid, circuit separation that has already been completed is often maintained for, for example, 48 hours in an extended run-on period with the ignition switched off and the circuit valve is energized. In addition, after waking up from a sleep mode and a plunger circuit leak being identified, the first partial chamber is refilled with brake fluid volume from the second partial chamber.

However, these two functions are subject to restrictions. The extended run-on period is limited in time. At the latest after the end of the run-on period, there is a transition to a single-circuit braking system and thus a loss of the volume of the first partial chamber. The duration of the extended run-on period depends on the charge level of the battery. The extended run-on period does not completely protect against loss of the volume of the first partial chamber either. Gravitational pressure generates a leakage flow via the closed circuit isolating valve, which can lead to emptying of the partial chamber. Refilling the first partial chamber reduces the brake fluid volume of the second partial chamber by the corresponding amount. Refilling is therefore limited.

SUMMARY

The object is therefore to increase the readiness of the brake system in the case of a leak.

A method in the event of a leak during a transition to a standby state is provided. A linear actuator is activated to take a brake fluid volume out of the first partial reservoir via the open circuit isolating valve and to displace it into the second partial reservoir. The brake fluid is thus protected from leaking even in the sleep mode without the valves being energized.

In one embodiment, when a leak is detected, the brake system is separated into two partial circuits by closing the circuit isolating valve, wherein a first partial circuit comprises at least the master brake cylinder with the first partial reservoir and also two first wheel brakes with associated inlet valves and outlet valves, and a second partial circuit comprises at least the linear actuator with the second partial reservoir and also two second wheel brakes with associated inlet valves and outlet valves. The displacement of the brake fluid volume from the first into the second partial chamber can then be performed for example before the circuit separation, for example in the sleep mode, is canceled.

In another embodiment, the brake fluid volume is displaced from the first partial chamber into the second partial chamber only if the leak is present in the second partial circuit. For example, the method can also be implemented specifically when at least one wheel brake in the second partial circuit has a leak and at least one wheel brake does not have a leak.

In another embodiment, the circuit separation is maintained for a predetermined period of time during a transition to a standby state, wherein the brake fluid volume of the first partial chamber is displaced into the second partial chamber at the end of the predetermined period of time. This allows the brake fluid to be protected even when the state of charge of the battery is low.

In another embodiment, the brake system is designed in such a way that, in a de-energized state, the first partial chamber is connected to the wheel brakes. Such a brake system has the advantage that the brake system can also be operated without electricity by pure hydraulics.

In another embodiment, a brake fluid volume is displaced from the first partial reservoir into the second partial reservoir until the first partial reservoir is emptied. This can be monitored and controlled by a filling level sensor of the first partial chamber or brake fluid volume is displaced until emptying can be assumed given the existing size ratios of the individual vessels.

In another embodiment, for the purpose of displacing the brake fluid volume out of the linear actuator into the second partial reservoir, the circuit isolating valve is closed, the inlet valve of the wheel brake with a leak is closed, the inlet valve and the outlet valve of the wheel brake without a leak are opened and the linear actuator is operated in the pressure build-up direction. The brake fluid volume is thus conveyed into the brake fluid vessel via the wheel without a leak. In order to determine which wheel brake has the leak, for example, the linear actuator can be connected with open flow individually to the wheel brakes in succession and a hydraulic pressure can be built up by the linear actuator. In so doing, a check is made as to what distance is required to build up the pressure in each case, as a result of which it is identified whether there is a leak at the respective wheel brake. The wheel brake at which the leak is located is thus identified.

In another embodiment, for the purpose of taking the brake fluid volume out of the first partial chamber into the linear actuator, an open-flow connection is established between the linear actuator and the first partial chamber and the linear actuator is operated in the pressure reduction direction. Brake fluid is thus drawn from the first partial chamber.

In another embodiment, the open-flow connection is established via the master brake cylinder and/or via inlet valves and outlet valves of at least one wheel brake. In the process, suction is preferably performed via the master brake cylinder since this prevents brake fluid from being conveyed backwards through inlet valves and outlet valves. This is risky due to contamination.

In another embodiment, when the brake fluid volume is taken out of the first partial chamber, the linear actuator is operated in such a way that a generated vacuum remains lower than a threshold value.

In another embodiment, the linear actuator is connected to the second partial chamber via a non-return valve, which opens at a return differential pressure, and wherein the threshold value is lower than twice the return differential pressure. This prevents the linear actuator from sucking brake fluid primarily out of the second partial chamber. The threshold value may be less than 150%, for example less than 100%, of the return differential pressure.

The object is also achieved by a brake system for a motor vehicle comprising a mechanically actuable master brake cylinder, which is connected to a first partial reservoir of a brake fluid vessel, and an electric linear actuator, which is connected to a second partial reservoir of the brake fluid vessel, wherein the master brake cylinder and the linear actuator are connected via an electrically closable circuit isolating valve, wherein a control unit of the brake system is designed to carry out one of the preceding methods.

BRIEF DESCRIPTION OF THE DRAWINGS

Further features, advantages and possible applications can also be found in the description below of exemplary embodiments and the drawings. All of the features described and/or pictorially depicted belong to the subject matter of the invention both individually and in any combination, also independently of their summarization in the claims or the back-references thereof.

DETAILED DESCRIPTION

Figure 1:
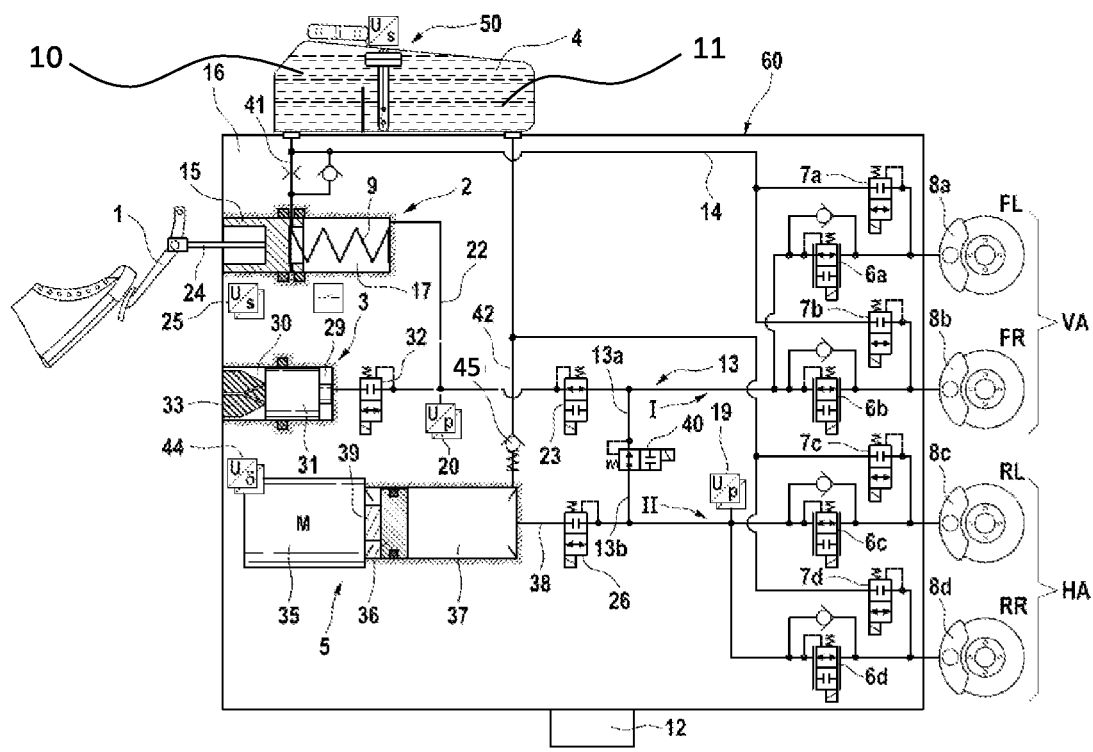
FIG. 1 schematically shows an exemplary brake system.

A braking system for a motor vehicle shown in FIG. 1 comprises four hydraulically actuable wheel brakes 8a-8d. The brake system comprises a master brake cylinder 2 which can be actuated by means of an actuating or brake pedal 1, a travel simulator or a simulation device 3 which interacts with the master brake cylinder 2, a pressure medium storage tank 4 which is under atmospheric pressure, an electrically controllable pressure application device 5, and wheel-specific brake pressure modulation valves which are configured according to the example as inlet valves 6a-6d and outlet valves 7a-7d. Furthermore, the braking system comprises an electronic open-loop and closed-loop control unit 12 for controlling the electrically actuable components of the brake system. This can also be composed of several individual control devices.

According to the example, the wheel brake 8a is assigned to the left front wheel (FL), the wheel brake 8b is assigned to the right front wheel (FR), the wheel brake 8c is assigned to the left rear wheel (RL), and the wheel brake 8d is assigned to the right rear wheel (RR).

The master brake cylinder 2 has, in a housing 16, a master brake cylinder piston 15, which delimits a hydraulic pressure chamber 17, and constitutes a single-circuit master brake cylinder. The pressure chamber 17 receives a restoring spring 9 which, with the master brake cylinder 2 unactuated, positions the piston 15 in a starting position. At one end, the pressure chamber 17 is connected to the pressure medium storage tank 4 via radial bores, which are formed in the piston 15, and a corresponding pressure equalization line 41, wherein this connection can be shut off by a relative movement of the piston 17 in the housing 16. At the other end, the pressure chamber 17 is connected by means of a hydraulic line section (also referred to as first feed line) 22 to a brake supply line 13 to which the input connections of the inlet valves 6a-6d are connected. The pressure chamber 17 of the master brake cylinder 2 is thus connected to all inlet valves 6a-6d.

According to the example, no valve, for example no electrically or hydraulically actuable valve and no non-return valve, is arranged in the pressure equalization line 41 or in the connection between the pressure chamber 17 and the pressure medium storage tank 4.

As an alternative, a normally open, diagnostic valve, for example a connection in parallel between a normally open diagnostic valve and a non-return valve which closes in the direction of the pressure medium storage tank 4, can be contained in the pressure equalization line 41 or between the master brake cylinder 2 and the pressure medium storage tank 4.

An isolating valve 23 is arranged between the feed line 22, which is connected to the pressure chamber 17, and the brake supply line 13, or the pressure chamber 17 is connected to the brake supply line 13 via the first feed line 22 with an isolating valve 23. The isolating valve 23 is designed as an electrically actuable, for example normally open (NO), 2/2-way valve. The hydraulic connection between the pressure chamber 17 and the brake supply line 13 can be shut off by the isolating valve 23.

A piston rod 24 couples the pivoting movement of the brake pedal 1 as a result of pedal actuation to the translational movement of the master brake cylinder piston 15, the actuation travel of which is detected by a travel sensor 25 which may be of redundant design. In this way, the corresponding piston travel signal is a measure of the brake pedal actuation angle. It represents a braking demand of a vehicle driver.

A pressure sensor 20, which is connected to the first feed line 22, detects the pressure built up in the pressure chamber 17 as a result of a displacement of the piston 15. This pressure value can also be evaluated to characterize or determine the braking demand of the vehicle driver. As an alternative to a pressure sensor 20, use can also be made of a force sensor 20 for determining the braking demand of the vehicle driver.

According to the example, the simulation device 3 is of hydraulic configuration and is hydraulically coupled to the master brake cylinder 2. The simulation device 3 substantially has, for example, a simulator chamber 29, a simulator rear chamber 30 and a simulator piston 31 which separates the two chambers 29, 30 from each other. The simulator piston 31 is supported on a housing by an elastic element 33 (e.g. simulator spring) which is arranged in the simulator rear chamber 30 (which is dry according to the example). According to the example, the hydraulic simulator chamber 29 is connected to the pressure chamber 17 of the master brake cylinder 2 by means of a preferably electrically actuable, for example normally closed simulator enable valve 32.

The braking system or the brake system comprises an inlet valve 6a-6d and an outlet valve 7a-7d for each hydraulically actuable wheel brake 8a-8d, the inlet valves and outlet valves being hydraulically interconnected in pairs via center connections and connected to the wheel brake 8a-8d.

A non-return valve, not specifically designated, which opens in the direction of the brake supply line 13, is connected in parallel to each of the inlet valves 6a-6d. The output connections of the outlet valves 7a-7d are connected to the pressure medium storage tank 4 via a common return line 14.

The electrically controllable pressure-providing device 5 is designed as a hydraulic cylinder-piston arrangement (or as a single-circuit, electrohydraulic actuator (linear actuator)), the piston 36 of which can be actuated by a schematically indicated electric motor 35 with interconnection of a likewise schematically illustrated rotation-translation mechanism 39. The piston 36 delimits the single pressure chamber 37 of the pressure-providing device 5. A merely schematically indicated rotor position sensor which serves to detect the rotor position of the electric motor 35 is denoted by reference sign 44.

A line section (also referred to as second feed line) 38 is connected to the pressure chamber 37 of the electrically controllable pressure-providing device 5. The feed line 38 is connected to the brake supply line 13 via an electrically actuable, normally closed, sequence valve 26. The sequence valve 26 allows the hydraulic connection between the pressure chamber 37 of the electrically controllable pressure-providing device 5 and the brake supply line 13 (and thus the input connections of the inlet valves 6a-6d) to be opened and shut off in a controlled manner. The actuator pressure produced by the action of force of the piston 36 on the pressure medium enclosed in the pressure chamber 37 is fed into the second feed line 38. In a "brake-by-wire" mode, for example in a fault-free state of the brake system, the feed line 38 is connected to the brake supply line 13 via the sequence valve 26. In this way, there is, during normal braking, a build up and a reduction in wheel brake pressure for all the wheel brakes 8a-8d owing to the forward and backward movement of the piston 36.

In the case of a reduction in pressure by backward movement of the piston 36, the pressure medium previously displaced from the pressure chamber 37 of the pressure-providing device 5 into the wheel brakes 8a-8d flows back again into the pressure chamber 37 in the same way.

As an alternative, wheel brake pressures which differ in a wheel-specific manner can be easily adjusted by means of the inlet and outlet valves 6a-6d, 7a-7d. In the case of a corresponding reduction in pressure, the portion of pressure medium discharged via the outlet valves 7a-7d flows via the return line 14 into the pressure medium storage tank 4. Additional pressure medium can be drawn into the pressure chamber 37 owing to a backward movement of the piston 36 with the sequence valve 26 closed by way of pressure medium being able to flow out of the tank 4 into the actuator pressure chamber or pressure chamber 37 via the line 42 with a non-return valve 45, which opens in a flow direction to the actuator 5. The non-return valve 45 typically opens starting at a differential pressure of approximately 0.08 bar.

According to the example, the pressure chamber 37 is also connected to the pressure medium storage tank 4 via one or more snifter holes in an unactuated state of the piston 36. This connection between the pressure chamber 37 and the pressure medium storage tank 4 is disconnected when the piston 36 is (sufficiently) actuated in the actuating direction.

In the brake supply line 13 there is arranged an electrically actuable, normally open circuit isolating valve 40 by means of which the brake supply line 13 can be separated into a first line section 13a, which is connected (via the isolating valve 23) to the master brake cylinder 2, and a second line section 13b, which is connected (via the sequence valve 26) to the pressure-providing device 5. The first line section 13a is connected to the inlet valves 6a, 6b of the wheel brakes 8a, 8b, and the second line section 13b is connected to the inlet valves 6c, 6d of the wheel brakes 8c, 8d.

With the circuit isolating valve 40 open, the brake system is of single-circuit design. The brake system can be separated or divided into two brake circuits (partial circuits) I and II, in for example controlled according to the situation, by closing the circuit isolating valve 40. Here, in the first brake circuit I, the master brake cylinder 2 is connected (via the isolating valve 23) to only the inlet valves 6a, 6b of the wheel brakes 8a, 8b of the front axle VA, and, in the second brake circuit II, the pressure-providing device 5 is connected (with the sequence valve 26 open) to only the wheel brakes 8c and 8d of the rear axle HA.

With the circuit isolating valve 40 open, the input connections of all the inlet valves 6a-6d can be supplied by means of the brake supply line 13 with a pressure which corresponds to the brake pressure which is provided by the pressure-providing device 5 in a first operating mode (e.g. "brake-by-wire" operating mode). In a second operating mode (e.g. in a de-energized fallback operating mode), the pressure of the pressure chamber 17 of the master brake cylinder 2 can be applied to the brake supply line 13.

The brake system comprises a level-measuring device 50 for determining a pressure medium level/filling level in the pressure medium storage tank 4.

The pressure medium storage tank 4 has a first partial chamber 10 and a second partial chamber 11, which are separated from each other via a bulkhead. The first partial chamber 10 provides brake fluid for the master brake cylinder 2 via the pressure equalization line 41. The second chamber 11, on the other hand, supplies the linear actuator 5 with brake fluid via the pressure equalization line 42 and the non-return valve 120.

According to the example, the hydraulic components, namely the master brake cylinder 2, the simulation device 3, the pressure-providing device 5, the valves 6a-6d, 7a-7d, 23, 26, 40 and 32 and also the hydraulic connections including the brake supply line 13, are arranged together in a hydraulic open-loop and closed-loop control unit 60 (HCU). The electronic open-loop and closed-loop control unit (ECU) 12 is assigned to the hydraulic open-loop and closed-loop control unit 60. The hydraulic and the electronic open-loop and closed-loop control unit 60, 12 are configured as one unit (HECU).

The brake system comprises a pressure sensor 19 or system pressure sensor for detecting the pressure provided by the pressure-providing device 5. Here, the pressure sensor 19 is arranged behind the sequence valve 26 as seen from the pressure chamber 37 of the pressure-providing device 5.

If pressure is reduced over a relatively long period of time or several times in succession via the outlet valves 7a to 7d of the wheel brakes 8a to 8d, the piston 36 of the linear actuator 5 moves successively forward until it has reached its foremost position, from which an additional volume flow can no longer be provided. At this point in time at the latest, the linear actuator has to be refilled by means of a refill.

For such a refill of the linear actuator 5, the sequence valve 26 is closed and then the piston 36 is moved back. As a result, brake fluid is drawn out of the reservoir 4 via the non-return valve 45.

When initializing the brake system, for example when unlocking the vehicle, the level-measuring device 50 is used to check whether the brake fluid level is sufficient. If this is the case, the brake system starts in the normal operating mode. If, on the other hand, the brake fluid level lies below a threshold value, the single-circuit brake system is converted into a two-circuit brake system by closing the circuit isolating valve 40. As a result, the partial circuit not affected by the leak is effectively protected from the leak.

In addition, a leak test is typically performed to locate the leak. For this purpose, the linear actuator 5 is connected successively via the sequence valve 26 and an open inlet valve 6 to the individual wheel brakes 8, the outlet valve 7 of which is closed. The remaining inlet valves 6 are each closed here. A pressure is built up here by means of the linear actuator 5 and the required travel is controlled. If the travel is abnormally high or the pressure cannot be maintained, the brake system assumes a leak at the corresponding wheel.

When the braking system enters a sleep mode after the vehicle is parked, all valves generally move to their de-energized position. Since the circuit isolating valve 40 is configured as a normally open valve, circuit separation is lost in the sleep mode. In order to prevent this, the circuit separation can still be maintained in the sleep mode for a specified period of time in a so-called run-on period. However, since the energy reserves are limited by the vehicle battery, this extended run-on period is also limited.

FIG. 2 to FIG. 5 show time profiles of the volumes of the first partial chamber 10 and the second partial chamber 11 for a situation in which the vehicle is repeatedly operated with circuit separation for one hour and is then parked in the sleep mode for 23 h.

Figure 2:
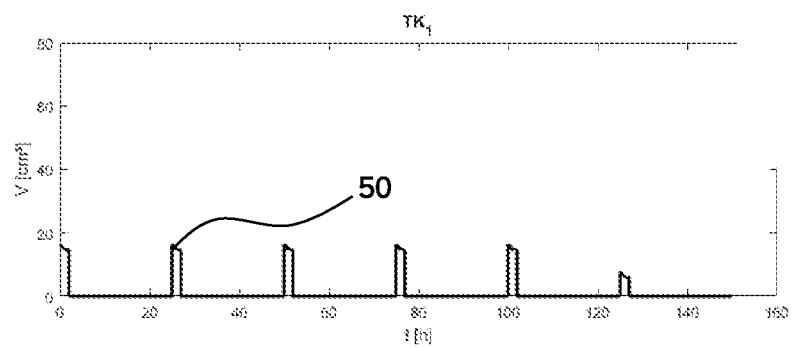
FIG. 2 shows a graph of the brake fluid volume of the first partial chamber.
Figure 3:
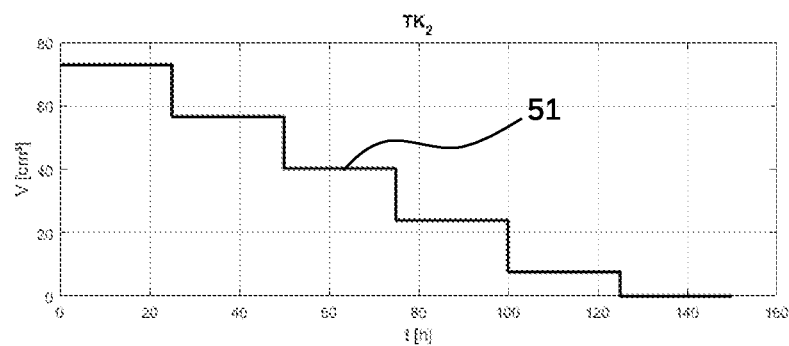
FIG. 3 shows a graph of the brake fluid volume of the second partial chamber.

FIG. 2 and FIG. 3 show the time profiles from the method known from the prior art. A leak has already been detected at the rear-axle wheel brake 8*d* and the active circuit separation has been implemented by closing the circuit isolating valve 40. In addition, the sequence valve 26 has been closed and the linear actuator 5 has been switched off. The brake system is accordingly braked by the muscle power of the driver and the master brake cylinder 2 on the front wheel brakes 8*a* and 8*b*. As shown in FIG. 2, the filling level of the first partial chamber 10 is just below 20 cm$^3$ at the beginning, this corresponding to a full first partial chamber 10. As a result of the leak, some brake fluid volume is now slowly lost during operation via the closed circuit isolating valve 40 since this does not close completely tightly. The volume of the second partial chamber 11 remains constant, protected by the closed sequence valve 26, as can be seen from the graph of FIG. 3. When the vehicle is turned off, the brake system enters a de-energized sleep mode, as a result of which the circuit separation is canceled. There is thus a direct open-flow connection between the leak of the rear wheel brake 8*d* and the first partial chamber 10 via the master brake cylinder 2. The first partial chamber 10 runs empty. This can be seen in the graph of FIG. 2, which shows that the volume of the first partial chamber 10 rapidly drops to zero. During subsequent operation of the vehicle, the brake system is re-initialized and the empty first partial chamber 10 is detected. To enable braking operation, brake fluid is pumped out of the second partial chamber 11 into the first partial chamber 10. This can be seen in FIGS. 2 and 3, which show how the second partial chamber volume is reduced exactly to the extent that the volume of the first partial chamber 10 rises again. These steps are repeated during each subsequent initialization of the brake system, as a result of which the volume in the second partial chamber successively decreases. During the fourth initialization, the remaining brake fluid volume in the second partial chamber 11 is no longer sufficient to completely fill the first partial chamber 10. Safe braking operation is then no longer possible.

Figure 4:
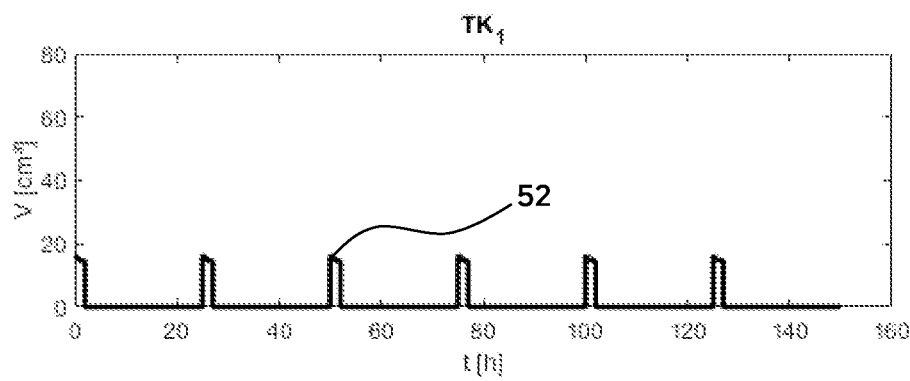
FIG. 4 shows a graph of the brake fluid volume of the first partial chamber.
Figure 5:
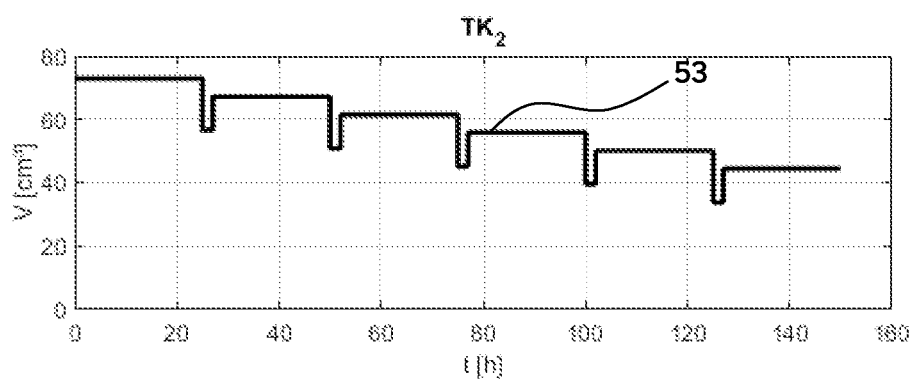
FIG. 5 shows a graph of the brake fluid volume of the second partial chamber.
Figure 6:
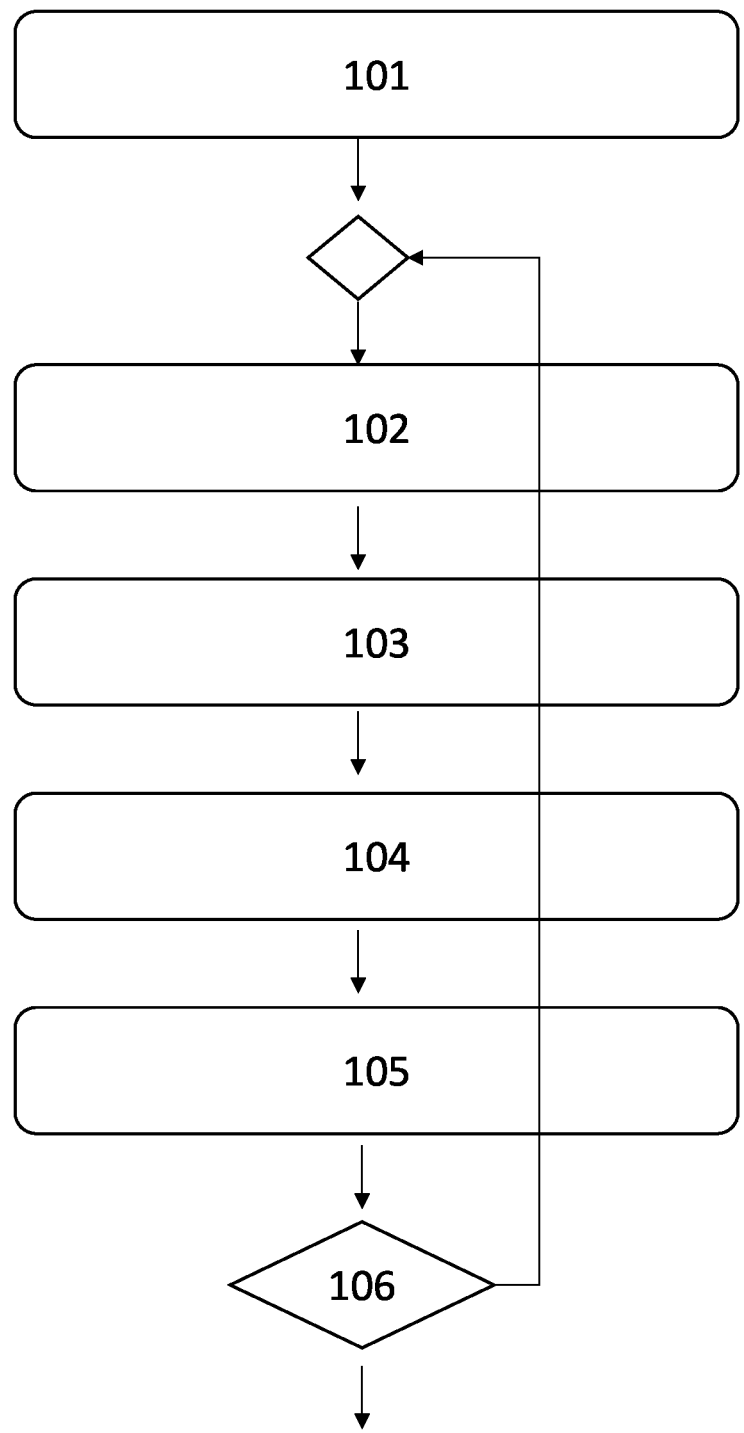
FIG. 6 shows a flowchart comprising one embodiment of a method of operating a brake system.

FIGS. 4 and 5 then show corresponding graphs for the method disclosed herein, which is shown step by step in FIG. 6.

In step 101, a leak is detected in a wheel brake 8*d* and at the same time a wheel brake 8*c* without a leak is determined. During the transition to the sleep mode, the volume of the first partial chamber 10 is displaced into the second partial chamber 11. For this purpose, in step 102, the sequence valve 26 is opened and the circuit isolating valve 40 is closed. The inlet valve 6*d* and the outlet valve 7*d* of the wheel that has a leak are closed and the inlet valve 6*c* and the outlet valve 7*c* of the wheel without a leak are opened. In step 103, the linear actuator 5 is then moved to its front end position, as a result of which the brake fluid volume contained therein is displaced via the inlet valve 6*c* and the outlet valve 7*c* of the wheel without a leak into the second partial chamber 11.

In step 104, the circuit isolating valve 40 and the isolating valve 23 are opened. All the inlet valves 6 are closed. In step 105, the linear actuator is then activated with a greatly reduced speed of 30-40 rpm to return to its rear end position. The resulting slight vacuum of about 0.1 bar draws only a small amount of brake fluid via the non-return valve 45 and out of the second partial chamber 11. The linear actuator 5 draws brake fluid from the first partial chamber 10 through the open sequence valve 26, circuit isolating valve 40, isolating valve 23 and through the master brake cylinder 2.

FIG. 4 correspondingly shows, just like FIG. 2, a steep drop in the volume of the first partial chamber 10 at the end of the active hour, but the volume is not lost owing to the leak and rather is fed to the second partial chamber 11, as can be seen in FIG. 5. There, the brake fluid volume is protected from leaking by the closed sequence valve 26. When the brake system is subsequently initialized, the first partial chamber 10 is then refilled from the second partial chamber 11.

The steps of drawing brake fluid from the first partial chamber 10 and of displacing the brake fluid into the second partial chamber 11 are repeated in step 106 for a prespecified number of, for example three, cycles. As an alternative, a sensor can be provided in the first partial chamber 10, and brake fluid is displaced until the sensor indicates that the first partial chamber 10 has been emptied.

The embodiments prevent a loss of brake fluid in the sleep mode and thus ensures the brake system is able to function for a long time.

The invention claimed is:

1. A method for controlling a brake system comprising:
   transitioning a brake system to a standby state;
   detecting if a leak is present at one of the wheel brakes during the transition; and
   displacing a brake fluid volume from a first partial reservoir of a brake fluid vessel via a circuit isolating valve which is open into a second partial reservoir of the brake fluid vessel by activating an electric linear actuator of a the brake system.

2. The method as claimed in claim 1, further comprising separating the brake system into two partial circuits by closing the circuit isolating valve when the leak is detected, wherein a first partial circuit comprises at least a master brake cylinder with the first partial reservoir and also two first wheel brakes with associated inlet valves and outlet valves, and a second partial circuit comprises at least the linear actuator with the second partial reservoir and also two second wheel brakes with associated inlet valves and outlet valves.

3. The method as claimed in claim 2, wherein displacing the brake fluid volume from the first partial chamber into the second partial chamber only occurs when the leak is present in the second partial circuit.

4. The method as claimed in claim 1, further comprising maintaining the circuit separation for a predetermined period of time during the transition to a standby state, and displacing the brake fluid volume of the first partial chamber into the second partial chamber at the end of the predetermined period of time.

5. The method as claimed in claim 1, wherein the first partial chamber is connected to the wheel brakes when the brake system is in a de-energized state.

6. The method as claimed in claim 1, further comprising displacing the brake fluid volume from the first partial reservoir into the second partial reservoir until the first partial reservoir is emptied.

7. The method as claimed in claim 1, further comprising:
closing the circuit isolating valve to displace the brake fluid volume out of the linear actuator into the second partial reservoir;
closing an inlet valve of the wheel brake with the leak is closed, the opening an inlet valve and an outlet valve of the wheel brake without the leak; and
operating the linear actuator in a pressure build-up direction.

8. The method as claimed in claim 1, wherein displacing the brake fluid volume further comprising taking the brake fluid volume out of the first partial chamber into the linear actuator, and wherein an open-flow connection is established between the linear actuator and the first partial chamber and the linear actuator is operated in the pressure reduction direction.

9. The method as claimed in claim 8, further comprising establishing an open-flow connection via the master brake cylinder and/or via inlet valves and outlet valves of at least one wheel brake.

10. The method as claimed in claim 1, wherein displacing the brake fluid volume further comprises taking the brake fluid volume out of the first partial chamber, and wherein the linear actuator is operated such that a generated vacuum remains lower than a threshold value.

11. The method as claimed in claim 10, further comprising connecting the linear actuator to the second partial chamber via a non-return valve, which opens at a return differential pressure, and wherein the threshold value is lower than twice the return differential pressure.

12. A brake system for a motor vehicle comprising:
a mechanically actuable master brake cylinder a first partial reservoir of a brake fluid vessel fluidly connected to the master brake cylinder;
a second partial reservoir of the brake fluid vessel;
an electric linear actuator connected to the first and second partial reservoirs of the brake fluid vessel, wherein the master brake cylinder and the linear actuator are connected via an electrically closable circuit isolating valve; and
a control unit of the brake system with instructions for:
transitioning the brake system to a standby state;
detecting if a leak is present at one of the wheel brakes during the transition; and
displacing a brake fluid volume from the first partial reservoir via the circuit isolating valve which is open into the second partial reservoir by activating the electric linear actuator.

13. The brake system as claimed in claim 12, further comprising instructions for separating the brake system into two partial circuits by closing the circuit isolating valve when the leak is detected, wherein a first partial circuit comprises at least the master brake cylinder with the first partial reservoir and also two first wheel brakes with associated inlet valves and outlet valves, and a second partial circuit comprises at least the linear actuator with the second partial reservoir and also two second wheel brakes with associated inlet valves and outlet valves.

14. The brake system as claimed in claim 13, wherein displacing the brake fluid volume from the first partial chamber into the second partial chamber only occurs when the leak is present in the second partial circuit.

15. The brake system as claimed in claim 12, further comprising instructions for maintaining the circuit separation for a predetermined period of time during the transition to a standby state and displacing the brake fluid volume of the first partial chamber into the second partial chamber at the end of the predetermined period of time.

16. The brake system as claimed in claim 12, wherein the first partial chamber is connected to the wheel brakes when the brake system is in a de-energized state.

17. The brake system as claimed in claim 12, further comprising instructions for displacing the brake fluid volume from the first partial reservoir into the second partial reservoir until the first partial reservoir is emptied.

18. The brake system as claimed in claim 12, further comprising instructions for:
closing the circuit isolating valve to displace the brake fluid volume out of the linear actuator into the second partial reservoir;
closing an inlet valve of the wheel brake with the leak is closed, the opening an inlet valve and an outlet valve of the wheel brake without the leak; and
operating the linear actuator in a pressure build-up direction.

19. The brake system as claimed in claim 12, wherein displacing the brake fluid volume further comprising taking the brake fluid volume out of the first partial chamber into the linear actuator, and wherein an open-flow connection is established between the linear actuator and the first partial chamber and the linear actuator is operated in the pressure reduction direction.

20. The brake system as claimed in claim 12, further comprising instructions for establishing an open-flow connection via the master brake cylinder and/or via inlet valves and outlet valves of at least one wheel brake.

* * * * *